(12) United States Patent
Shaw

(10) Patent No.: US 7,571,171 B1
(45) Date of Patent: Aug. 4, 2009

(54) SMART TRIGGER FOR USE IN PROCESSING BUSINESS TRANSACTIONS

(75) Inventor: Robert Jay Shaw, Dallas, TX (US)

(73) Assignee: Computer Sciences Corporation, Austin, TX (US)

( * ) Notice: Subject to any disclaimer, the term of this patent is extended or adjusted under 35 U.S.C. 154(b) by 889 days.

(21) Appl. No.: 09/699,038

(22) Filed: Oct. 27, 2000

Related U.S. Application Data

(60) Provisional application No. 60/162,602, filed on Oct. 29, 1999.

(51) Int. Cl.
*G06F 7/00* (2006.01)
*G06F 17/00* (2006.01)
*G06Q 40/00* (2006.01)

(52) U.S. Cl. .................. 707/101; 707/3; 707/401.1; 705/35; 705/38; 705/42

(58) Field of Classification Search .............. 705/35, 705/36, 38, 42, 1, 45, 36 R; 707/102, 201, 707/101, 104.1, 3
See application file for complete search history.

(56) References Cited

U.S. PATENT DOCUMENTS

| | | | |
|---|---|---|---|
| 4,606,002 A | 8/1986 | Waisman et al. | |
| 4,878,167 A | 10/1989 | Kapulka et al. | |
| 5,099,422 A | 3/1992 | Foresman et al. | |
| 5,191,522 A | 3/1993 | Bosco et al. | |
| 5,201,044 A | 4/1993 | Frey, Jr. et al. | |
| 5,230,048 A * | 7/1993 | Moy ........................... | 707/1 |
| 5,233,513 A | 8/1993 | Doyle | |

(Continued)

FOREIGN PATENT DOCUMENTS

EP    0280773 A2 *   11/1987

(Continued)

OTHER PUBLICATIONS

"Best Seeks More Uniform Data On Insurer CAT Models (AM Best and Paragon Reinsurance Risk Management Services jointly developing a database of catastrophe exposures for insurers in the US)"; Mar. 8, 1999; Business Insurance; pp. 1-3.*

(Continued)

*Primary Examiner*—Ella Colbert
(74) *Attorney, Agent, or Firm*—Meyertons, Hood, Kivlin, Kowert & Goetzel, P.C.; Eric B. Meyertons

(57) ABSTRACT

A method and system for the selective identification and execution of a specific processing task for one or more records contained in the one or more Financial Service Organization (FSO) data sets. An FSO computer user may configure a smart trigger table by defining a scheduled date, an identifier for a data set and an associated processing task. The FSO user may schedule a task to be executed at a periodic interval to process entries in the smart trigger table. If conditions have been met to process the smart trigger table then each row in the smart trigger table, which have been specifically identified to need processing, may be processed by only executing the associated processing task specified in the smart trigger table record. After processing the smart trigger table record the scheduled date entry may be reset to indicate its completion.

33 Claims, 11 Drawing Sheets

U.S. PATENT DOCUMENTS

| | | | |
|---|---|---|---|
| 5,257,366 A | 10/1993 | Adair et al. ............... 707/4 |
| 5,386,566 A | 1/1995 | Hamanaka et al. |
| 5,394,555 A | 2/1995 | Hunter et al. |
| 5,421,011 A | 5/1995 | Camillone et al. |
| 5,434,994 A | 7/1995 | Shaheen et al. |
| 5,455,947 A | 10/1995 | Suzuki et al. |
| 5,483,632 A | 1/1996 | Kuwamoto et al. |
| 5,495,608 A * | 2/1996 | Antoshenkov ............ 707/3 |
| 5,499,330 A | 3/1996 | Lucas et al. |
| 5,504,674 A | 4/1996 | Chen et al. |
| 5,513,348 A | 4/1996 | Ryu et al. |
| 5,523,942 A | 6/1996 | Tyler et al. |
| 5,524,205 A | 6/1996 | Lomet et al. |
| 5,550,976 A | 8/1996 | Henderson et al. |
| 5,586,310 A | 12/1996 | Sharman |
| 5,615,309 A | 3/1997 | Bezek et al. |
| 5,615,367 A * | 3/1997 | Bennett et al. ............ 707/102 |
| 5,638,508 A | 6/1997 | Kanai et al. |
| 5,689,706 A | 11/1997 | Rao et al. |
| 5,710,915 A | 1/1998 | McElhiney .............. 707/3 |
| 5,721,915 A | 2/1998 | Sockut et al. ............. 707/200 |
| 5,732,397 A | 3/1998 | De Tore et al. |
| 5,742,820 A | 4/1998 | Perlman |
| 5,745,901 A | 4/1998 | Entner et al. |
| 5,768,505 A | 6/1998 | Gilchrist et al. |
| 5,768,506 A | 6/1998 | Randell |
| 5,794,229 A | 8/1998 | French et al. |
| 5,797,134 A | 8/1998 | McMillan et al. |
| 5,832,481 A | 11/1998 | Sheffield |
| 5,864,679 A | 1/1999 | Kanai et al. |
| 5,867,494 A | 2/1999 | Krishnaswamy et al. |
| 5,870,711 A | 2/1999 | Huffman |
| 5,870,725 A | 2/1999 | Bellinger et al. ............ 705/45 |
| 5,870,746 A * | 2/1999 | Knutson et al. ............ 707/101 |
| 5,873,066 A | 2/1999 | Underwood et al. |
| 5,881,379 A | 3/1999 | Beier et al. |
| 5,892,905 A * | 4/1999 | Brandt et al. .............. 726/11 |
| 5,907,848 A | 5/1999 | Zaiken et al. |
| 5,909,683 A | 6/1999 | Miginiac et al. |
| 5,930,759 A | 7/1999 | Moore et al. |
| 5,933,816 A | 8/1999 | Zeanah et al. |
| 5,937,189 A | 8/1999 | Branson et al. |
| 5,940,809 A | 8/1999 | Musmanno et al. .......... 705/35 |
| 5,950,169 A | 9/1999 | Borghesi et al. |
| 5,950,192 A | 9/1999 | Moore et al. |
| 5,956,719 A | 9/1999 | Kudo et al. |
| 5,987,434 A | 11/1999 | Libman |
| 5,991,733 A | 11/1999 | Aleia et al. |
| 5,991,756 A | 11/1999 | Wu |
| 5,995,971 A | 11/1999 | Douceur et al. |
| 6,003,033 A | 12/1999 | Amano et al. |
| 6,026,381 A * | 2/2000 | Barton et al. ............. 705/36 R |
| 6,038,393 A | 3/2000 | Iyengar et al. |
| 6,049,665 A | 4/2000 | Branson et al. |
| 6,064,983 A | 5/2000 | Koehler |
| 6,073,140 A * | 6/2000 | Morgan et al. ............. 707/203 |
| 6,075,851 A | 6/2000 | Pinard et al. |
| 6,081,832 A | 6/2000 | Gilchrist et al. |
| 6,092,049 A | 7/2000 | Chislenko et al. |
| 6,105,007 A | 8/2000 | Norris |
| 6,112,209 A | 8/2000 | Gusack |
| 6,115,690 A | 9/2000 | Wong |
| 6,134,582 A | 10/2000 | Kennedy |
| 6,163,770 A | 12/2000 | Gamble et al. |
| 6,185,540 B1 | 2/2001 | Schreitmueller et al. |
| 6,202,070 B1 * | 3/2001 | Nguyen et al. ............ 707/104.1 |
| 6,226,623 B1 | 5/2001 | Schein et al. |
| 6,236,975 B1 | 5/2001 | Boe et al. |
| 6,272,482 B1 | 8/2001 | McKee et al. |
| 6,289,339 B1 | 9/2001 | Weber |
| 6,336,096 B1 | 1/2002 | Jernberg |
| 6,341,287 B1 * | 1/2002 | Sziklai et al. ............... 707/102 |
| 6,393,386 B1 | 2/2002 | Zager et al. |
| 6,385,612 B1 | 5/2002 | Troisi |
| 6,438,563 B1 | 8/2002 | Kawagoe |
| 6,442,533 B1 * | 8/2002 | Hinkle ...................... 705/35 |
| 6,446,086 B1 | 9/2002 | Bartlett et al. |
| 6,473,740 B2 | 10/2002 | Cockrill et al. |
| 6,557,752 B1 * | 5/2003 | Yacoob ..................... 235/375 |
| 6,662,164 B1 | 12/2003 | Koppelman et al. |
| 6,970,844 B1 | 11/2005 | Bierenbaum |

FOREIGN PATENT DOCUMENTS

| | | |
|---|---|---|
| EP | 0 280 773 | 9/1988 |
| EP | 0 465 018 | 1/1992 |
| EP | 0 836779 B1 * | 2/1996 |
| EP | 0 836 779 | 4/1998 |
| EP | 0 926 608 | 6/1999 |

OTHER PUBLICATIONS

The American Banker; "Technology Terms"; Sep. 8, 1986; vol. 151, No. 175; pp. 1-8.*

"@ Fault A Commitment to Consistency," Computer Sciences Corporation, Copyright 2000, pp. 1-2.

Merlin, Jr., William F., "Colossus: What We Know Today," The Merlin Law Group, Aug. 2000, Tampa FL, pp. 1-8.

Merlin, Jr., William F., "Collision Course With The Colossus Program: How To Deal With It," The Merlin Law Group, May 2000, Tampa, FL, pp. 1-17.

Merlin, Jr., William F., "Overcoming Allstate's Trade Secrets and Work-Product Objections," The Merlin Law Group, Mar. 2000, Tampa, FL, pp. 1-31.

Mead, Jay, Technical Communication, Aug. 1998, V. 45, N.3, p. 353-380.

Scopus Introduces World's Most Complete Call Center Solution for Financial Services; PR Newswire dated Nov. 5, 1997.

Borland, Russel; "Running Microsoft Outlook 97", Microsoft Press, 1997.

Juhl, Randy P., "The OTC Revolution"; Drugtopics.com; Mar. 3, 1997, pp. 1-9.

Continuum Connections, vol. I, No. 1, The Continuum Company, Inc., Nov. 1991, 16 pages.

Continuum Connections, vol. I, No. 2, The Continuum Company, Inc., Jan./Feb. 1992, 17 pages.

Continuum Connections, vol. I, No. 3, The Continuum Company, Inc., Mar./Apr. 1992, 16 pages.

Continuum Connections, vol. I, No. 4, The Continuum Company, Inc., Jul./Aug. 1992, 15 pages.

Continuum Connections, vol. II, No. 1, The Continuum Company, Inc., Oct./Nov. 1992, 16 pages.

Continuum Connections, vol. II, No. 2, The Continuum Company, Inc., Dec./Jan. 1993, 24 pages.

Continuum Connections, vol. II, No. 3, The Continuum Company, Inc., Mar./Apr. 1993, 16 pages.

Continuum Connections, vol. II, No. 4, The Continuum Company, Inc., Jul./Aug. 1993, 16 pages.

Continuum Connections, vol. II, No. 5, The Continuum Company, Inc., Nov./Dec. 1993, 20 pages.

Continuum Connections, vol. II, No. 6, The Continuum Company, Inc., Jan./Feb. 1994, 19 pages.

Continuum Connections, vol. III, No. 1, The Continuum Company, Inc., Mar./Apr. 1994, 24 pages.

Continuum Connections, vol. III, No. 2, The Continuum Company, Inc., Nov./Dec. 1994, 20 pages.

Continuum Connections, vol. III, No. 3, The Continuum Company, Inc., Mar./Apr. 1995, 16 pages.

Continuum Connections to the Americas, vol. 1, No. 1, The Continuum Company, Inc., Sep. 1995, 49 pages.

Continuum Connections, vol. III, No. 4, The Continuum Company, Inc., Oct./Nov. 1995, 24 pages.

Continuum Connections to the Americas, vol. 2, No. 1, The Continuum Company, Inc., Jan. 1996, 59 pages.

Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
International search report application No. PCT/US00/18016, mailed Nov. 10, 2000.
International search report application No. PCT/US 00/18020 mailed Nov. 10, 2000.

* cited by examiner

| Todays Date 380 | Scheduled Date 320 | Account Data Set Pointer List 310 |
|---|---|---|
| 12/31/1999 | 12/31/1999 | A12345 |
| ....... | ....... | ....... |
| ....... | ....... | A12399 |

Figure 3b

| Current Data Set Record Pointer 700 | Processing Task Number 710 |
|---|---|
| P2 | T1 |
| P5 | T1 |
| PN | T1 |

| Current Data Set Record Pointer | Processing Task Number |
|---|---|
| P1 | T2 |
| P3 | T2 |
| PN | T2 |

| Current Data Set Record Pointer | Processing Task Number |
|---|---|
| P7 | T(N-1) |
| P11 | T(N-1) |
| PN | T(N-1) |

| Current Data Set Record Pointer | Processing Task Number |
|---|---|
| P4 | TN |
| P9 | TN |
| PN | TN |

Figure 7

SMART TRIGGER FOR USE IN PROCESSING BUSINESS TRANSACTIONS

PRIORITY CLAIM

This application claims the benefit of U.S. Provisional Application No. 60/162,602 entitled "Smart Trigger For Use In Processing Business Transactions," filed Oct. 29, 1999.

BACKGROUND OF THE INVENTION

1. Field of the Invention

The present invention generally relates to computer software programs and databases to be used in Financial Service Organizations (FSO's). More particularly, the present invention relates to the selective identification and execution of a specific processing task for one or more records contained in the one or more Financial Service Organization (FSO) data sets.

2. Description of the Related Art

FSOs such as banks, credit unions, etc., use computer systems running software programs to process customer account transactions. The computer systems may include databases for storing data such as the master files of customer account information, transactional data such as customer credit card purchase transactions, processing data such as the processing parameters used in processing transactions, and history data such as log files of daily activities for later batch processing.

Databases may be used in FSO business transaction processing systems to store, manage and retrieve data for a variety of applications. In many instances, the databases may be extremely large. The contents of the database may often occupy memory space measured in hundred's of gigabytes. When application programs need to access enormous amounts of data on a transactional basis, whether in batch mode or real-time mode, the FSO business transaction processing systems often utilize commercially available database products. One embodiment of a commercially available database product is the DB2 database from International Business Machines (IBM).

Some nomenclature is introduced here to aid in the understanding of terminology used within the FSO business transaction processing system. A trigger is a defined set of actions that are executed when a delete, insert, or update operation is carried out against a specified table in the FSO database. Stored procedures are similar to a trigger. Both consist of procedural logic that is stored at the database level. However, stored procedures are not event-driven and are not attached to a specific table. A stored procedure is explicitly executed by invoking a CALL to the procedure (instead of implicitly being executed like triggers). Additionally, a stored procedure can access many tables without being specifically associated to any of them.

An example of an FSO that may use such a business transaction processing system is a credit card institution. A credit card institution may issue credit cards to customers of the FSO. The credit card institution may also issue credit cards on behalf of client businesses such as department stores. The credit card institution may also acquire and process credit card transactions from customers and client businesses such as department stores. For example, a credit card institution may issue its own credit card. The credit card institution may also have a client department store. The credit card institution may issue a credit card under the department store's name, and may collect and process all credit card transactions for the department store, charging a fee for each transaction processed. Some of the credit card transactions collected by the credit card institution may be for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

The FSO business transaction processing system may include a data dictionary. A data dictionary may be defined as a collection of descriptions of the data items or elements in the database. For example, the FSO business transaction processing system data dictionary may describe the data elements involved in credit card processing. The data dictionary may describe each of the data elements in the database for credit card processing. Data sets are groups of data, such as master files and transactions, and may be comprised of data elements defined in the data dictionary. Examples of data elements in the FSO data dictionary are customer name, credit card type, and card issuer.

The FSO business transaction processing system may include processing parameters used in processing transactions. Processing parameters may be used to apply business logic to the data elements in the transaction during processing. An example of a transaction in the FSO system is a credit card transaction. An example of a processing parameter is a transaction price that may be charged to a client of a credit card institution for processing a credit card transaction.

The FSO transaction processing application software program may use one or more processing parameters while processing a transaction. A processing parameter may have different values for different transactions. The application software program may examine the values of one or more data elements in the transaction data or database master files to determine the value of a processing parameter for the transaction.

The FSO system database may include processing parameters used in processing transactions. Processing parameters may be used to apply business logic to the data elements in the transaction during processing. An example of a transaction in an FSO system is a credit card transaction. An example of a processing parameter is a transaction price that may be charged to a client of a credit card institution for processing a credit card transaction.

An FSO transaction processing software program may use one or more processing parameters while processing a transaction. A processing parameter may have different values for different transactions. The software program may examine the values of one or more data elements in the transaction data or master files to determine the value of a processing parameter for the transaction.

In one embodiment, an FSO transaction processing system may process one or more data sets using schedule based processing. The user of the FSO may schedule a period for execution of a processing task for the data set. On meeting the qualifications of the schedule, the scheduled processing tasks would be automatically executed.

In another embodiment, an FSO transaction processing system may processes data sets using random event based processing. The user of the FSO may at random or based on an event request the execution of a processing task for the data set. On meeting the qualifications, the requested processing task would be automatically executed.

In prior art and in one embodiment, the processing of data sets or master files was periodic and 'account centric'. Application programs in the FSO computer system had to be scheduled to read and evaluate sequentially every record in the data set to determine if one or more processing tasks were to be executed for the record. For example, a data set may contain a list of all account numbers for an FSO. Processing of an account at a pre-determined period, may comprise evaluating conditions to execute for each account number a list of one or more functions or processing tasks. Preferred embodiments of the processing tasks performed on an account number may require the FSO to raise credit limit, change expiration date, send card data for embossing, and others. For example, the FSO may need to extend the expiration date on a group of credit card accounts, which have a current expiration date of December 1999. The application program would sequentially access every record in an account master file and determine which one of the one or more functions or processing tasks is needed to be performed. Each record lacks information that identifies the particular processing task to be performed. This requires that each of the one or more functions or processing tasks must be queried to determine if it is applicable. If master file record matches the specified criteria of having an expiration date of December 1999, then it would execute the processing task that is subsequently found to be applicable i.e. extend the date of expiration of the credit card. If the evaluation criteria did not match then it would go to the next record in the FSO account master file. Assuming a master file has millions of records, and each record may have one or more processing tasks associated with it, the process of sequentially accessing every record to determine applicability of a processing task to a specific record is very inefficient and time consuming. The method also utilizes extensive FSO computer resources to process FSO data sets.

A conventional method to process FSO data sets in a random event based manner, may use a trigger function provided by IBM's DB2 database sub-system. This method limits FSO data set processing to a specified table. Processing of FSO data sets may need a trigger function to access multiple DB2 tables. Another embodiment of prior art, which is also based on IBM's DB2 database sub-system, may use a stored procedure to process FSO data sets. This method has one or more drawbacks, which may limit the usefulness in FSO data set processing applications. Stored procedures are not event driven and must be explicitly initiated by a CALL command in an application program of the FSO computer system.

It is, therefore, desirable to provide a method and a system to identify and execute only those processing tasks for an FSO data set which have been identified to need further processing. The Smart Trigger method and system to process FSO data sets, improves on the trigger and stored procedure methods by removing their drawbacks and uses periodic and event based techniques. The improved method and system is thus more 'function centric' and not 'account centric'.

SUMMARY OF THE INVENTION

The present invention provides various embodiments of an improved method and system for the selective identification and execution of a specific processing task for one or more records contained in the one or more Financial Service Organization (FSO) data sets. An FSO computer user may configure a smart trigger table by defining a scheduled date, an identifier for a data set and an associated processing task. In one embodiment, an identifier for a data set may be a pointer to database memory location of the data set. In one embodiment, an activity number and its corresponding activity data may define an associated processing task. In one embodiment, the specified scheduled date may determine the trigger condition.

In one embodiment, the FSO user may schedule a task to be executed at a specified interval to process entries in the smart trigger table. In one embodiment, the task may be defined to run on a periodic basis. If conditions have been met to process the smart trigger table then each row in the smart trigger table may be processed. In one embodiment, the current date and time may be used to compare to the specified interval of the scheduled task to determine if the conditions to initiate the processing of entries in the smart trigger table have been met. If the scheduled conditions have not been met then the scheduled task may wait. If the scheduled conditions have been met i.e., the specified interval has expired, then the scheduled task may initiate processing of each row in the smart trigger table. In one embodiment, only those rows of the smart trigger table, which have met the trigger conditions, may be processed by executing the associated processing task specified in the smart trigger table record. In one embodiment, the trigger condition may be met if the scheduled date is less than or equal to current date.

After processing the smart trigger table record, i.e., executing the associated processing task specified in the smart trigger table record, in one embodiment, the scheduled date entry for the processed smart trigger table record may be reset to indicate its completion.

BRIEF DESCRIPTION OF THE DRAWINGS

FIG. 3b is a diagram illustrating a Smart Trigger date dependent data set selection according to one embodiment;

FIG. 4b is a continuation of the flowchart in FIG. 4a;

FIG. 7 is a data flow diagram illustrating selective task processing of a FSO data set using Smart Trigger, according to one embodiment.

Figure 1:
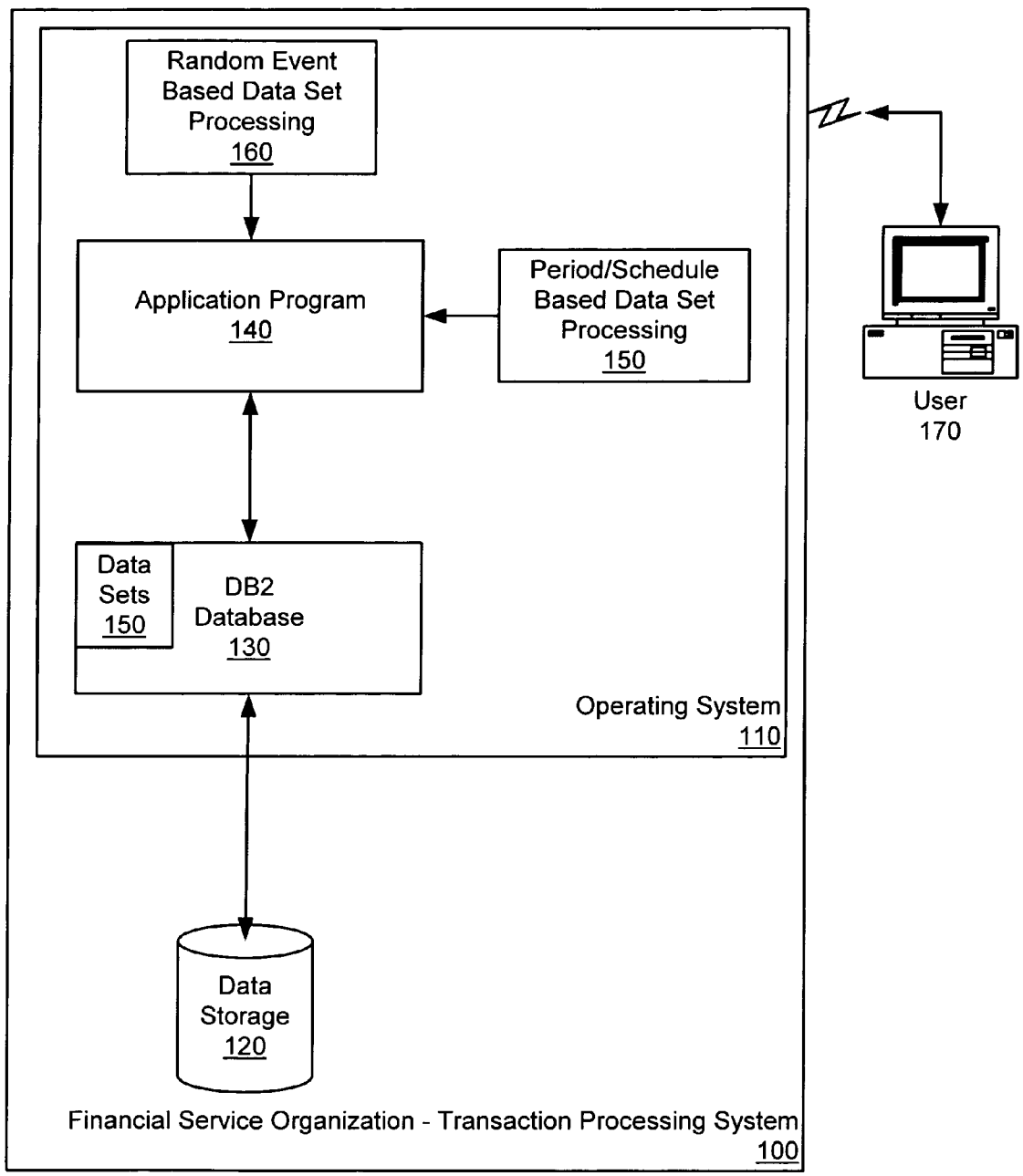
FIG. 1 is a prior art block diagram illustrating one embodiment of a financial service organization business transaction processing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

The term "computer system" as used herein generally describes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may comprise other types of memory or combinations thereof. In addition, the memory medium may be located in a first computer in which the programs are executed, or may be located in a second computer that connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for business modeler for defining and storing a model of an FSO production system as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system such as Windows NT available from Microsoft Corporation, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

A server program may be defined as a computer program that, when executed, provides services to other computer programs executing in the same or other computer systems. The computer system on which a server program is executing may be referred to as a server, though it may contain a number of server and client programs. In the client/server model, a server program awaits and fulfills requests from client programs in the same or other computer systems. An example of a computer program that may serve as a server is Windows NT server, available from Microsoft Corporation.

As used herein, a Financial Service Organization (FSO) is a business organization that provides financial services to customers and client organizations. As used herein, the term customer generally refers to an individual, and client organization generally refers to other businesses, including retail businesses and other FSOs. Services provided to customers and client organizations include credit products, such as loans and credit cards. An FSO may also provide services to client organizations such as credit card transaction processing. Examples of FSOs include, but are not limited to, banks and credit unions. An FSO that issues credit cards and processes credit card transactions may be referred to as a credit card institution. An FSO may include one or more organizational units. Examples of organizational units include, but are not limited to, main offices, divisions, regional offices, and branch offices.

As used herein, an FSO transaction may be defined as an occurrence of a service provided to a customer or client organization. Examples of FSO transactions include, but are not limited to, financial transactions such as deposits, withdrawals, loan application servicing, and credit card application servicing. FSO transactions may also include services related to financial products such as loans and credit cards previously issued to FSO customers and client organizations. These services may include processing of credit card purchases and collection of payments.

An FSO system may include a data dictionary. A data dictionary may be defined as a collection of descriptions of the data items or elements in the database. For example, an FSO system data dictionary may describe the data elements involved in credit card processing. The data dictionary may describe each of the data elements in the database for credit card processing. Groups of data such as master files and transaction data sets may comprise data elements defined in the data dictionary. Examples of data elements in an FSO data dictionary include, but are not limited to: customer name, credit card type, and card issuer.

The FSO system database may include processing parameters used in processing transactions. Processing parameters may be used to apply business logic to the transactions during processing. An example of a transaction processed in an FSO system is a credit card purchase transaction. An example of a processing parameter is a credit card purchase transaction price that may be charged to a client of a credit card institution for the processing of a credit card purchase transaction.

An FSO transaction processing software program may use one or more processing parameters during the processing of a transaction. A processing parameter may have different values for different transactions. The software program may examine the values of one or more data elements in the transaction data and master files to determine the value of a processing parameter for the transaction. A combination of data elements used to determine the value of a processing parameter may be referred to as a key definition for the processing parameter. The combination of data element values constructed from the key definition may be referred to as a key value. For example, a software program for processing credit card transactions for a credit card institution may use the credit card issuer and card type to determine what transaction price to charge a client of the credit card institution for processing a credit card transaction. The key definition in this example includes the credit card issuer data element and card type data element, and the key value is constructed from the values for the credit card issuer data element and card type data element read from the credit card transaction data or from a master file associated with the transaction.

In one embodiment, processing parameters and the key values used to identify them may be stored in tables in the database. The tables in the database that store the processing parameters and keys may be referred to as Process Control Data (PCD) tables. In one embodiment, there may be one PCD table for each processing parameter in the FSO system.

Processing parameters are one example of parameters that may be stored in PCD tables and located using key definitions as described herein. Examples of other types of parameters that may be stored in PCD tables are default parameters and definition parameters. Default parameters may be used to fill in default information in records in the database when they are created. For example, when a new customer account is created, one or more fields in the customer account master file may be filled with default parameter values. Default parameter values may be retrieved from PCD tables using key values constructed from the PCD key definitions and data element values from the customer account master file. Definition parameters are text or numeric values that are located using key values as codes. An example is a text error message that may be looked up using a numeric error code as a key value.

During processing, an FSO transaction may be stored as a record or file in the FSO system. In one embodiment, the FSO transaction may be stored in the FSO system database. A portion of the FSO transaction record may be read into system memory during processing. An FSO transaction record may include one or more data elements. The data elements included in an FSO transaction record may be defined in the data dictionary. The data elements in the transaction record may describe the various attributes of the transaction. For example, the data elements in a credit card transaction record may include items such as the customer's name, account numbers, credit card type, card issuer, date of the transaction, and the business at which the transaction originated.

An example of an FSO that may use an FSO computer system as described herein is a credit card institution. A credit card institution may issue credit cards to customers and client institutions of the FSO. The credit card institution may also issue credit cards on behalf of client businesses such as department stores. The credit card institution may also acquire and process credit card transactions from customers and client businesses such as department stores. For example, a credit card institution may issue its own credit card. Continuing the example, the credit card institution may also have client department stores. The credit card institution may issue a credit card under a department store's name, and may collect and process all credit card transactions for the department store. The credit card institution may charge a fee for each transaction processed. Some of the credit card transactions collected by the credit card institution may be transactions for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

In the above example, the fee charged for each transaction, also called the merchant transaction price, is an example of a processing parameter for an FSO system in a credit card institution. One embodiment of an FSO system database in a credit card institution may include a merchant transaction pricing PCD table. The merchant transaction pricing PCD table may include one or more merchant transaction pricing values. Each merchant transaction pricing value may be associated with one unique key value in the table. The key values in the PCD table may be constructed using a key definition. Each processing parameter in the FSO system, and thus each processing parameter PCD table, may be associated with a key definition. In one embodiment, the FSO system database may include a key definition table for storing key definitions in the FSO system.

A key definition may include one or more data elements from the data dictionary. As an example, the merchant transaction pricing parameter described above may have a key definition that includes one or more data elements. Examples of data elements that may be included as fields in the merchant transaction pricing parameter key definition include card issuer, card type, on us/not on us, and transaction type. A card issuer may be the brand of card, for example, VISA, MasterCard, Discovery, etc. Examples of card types may include, but are not limited to: "gold" and "platinum" cards issued by some card issuers. On us/not on us refers to whether the FSO processing the transaction also issued the credit card. "On us" may mean that the FSO did issue the card. "Not on us" may mean that another FSO issued the card, and thus the transaction may be forwarded to the other FSO for processing. The term "transaction type" may refer to the way the transaction was entered; examples of transaction types may include, but are not limited to: manual, electronic, and telephone transactions. A manual credit card transaction may be a credit card transaction that is entered by hand and imprinted with a credit card imprint machine. An electronic transaction may be a credit card transaction where the magnetic strip on a credit card is read electronically. A telephone transaction may be a credit card transaction performed by telephone call.

In FIG. 1, an embodiment of a financial service organization business transaction processing system 100 may include a computer operating system 110, a database 130 comprising one or more data sets 131 residing on a data storage system 120. System 100 includes memory (not shown) configured to store computer application programs 140 for execution on system 100, and a central processing unit (not shown) configured to execute instructions of computer application programs 140 residing on system 100. A user 170 of a financial service organization business transaction processing system 100 may interact with the system via an application program 140. In one embodiment, an Application program 140 may process data sets 131 included in database 130 using random event based data set processing 160. In another embodiment, an Application program 140 may process data sets 131 included in database 130 using schedule based data set processing 150.

Figure 2:
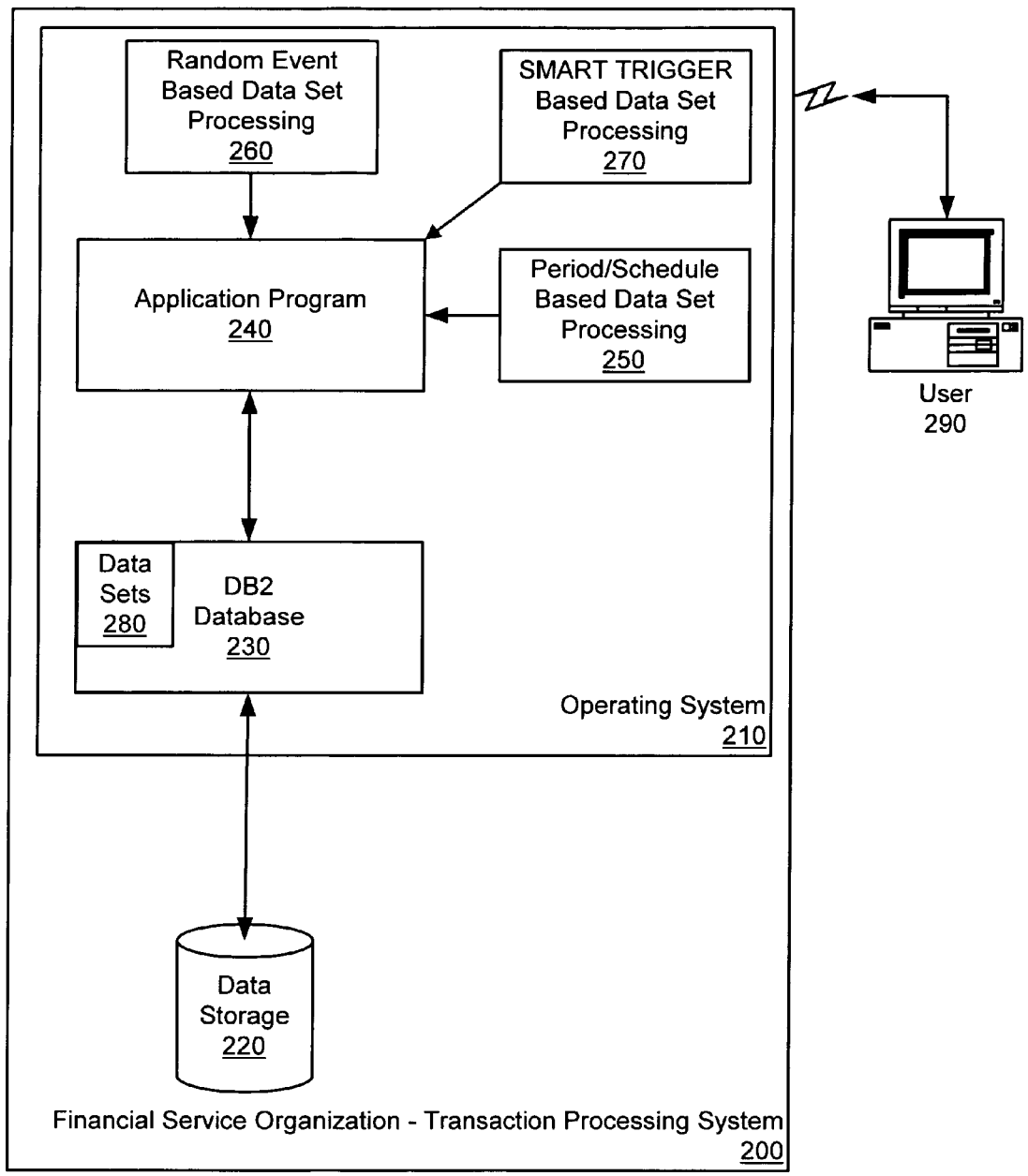
FIG. 2 illustrates one embodiment of a financial service organization business transaction processing system with Smart Trigger software.

FIG. 2 illustrates one embodiment of a financial service organization business transaction processing system with Smart Trigger software. In this embodiment, a financial service organization business transaction processing system 200 may include a computer operating system 210, a database 230 comprising one or more data sets 280 residing on a data storage system 220. System 200 includes memory (not shown) configured to store computer application programs 240 for execution on system 200, and a central processing unit (not shown) configured to execute instructions of computer application programs 240 residing on system 200. A user 270 of a financial service organization business transaction processing system 200 may interact with the system via an application program 240. In one embodiment, an Application program 240 may process data sets 280 included in database 230 using random event based data set processing 260. In another embodiment, an Application program 240 may process data sets 280 included in database 230 using schedule based data set processing 250. In another embodiment, an Application program 240 may process data sets 280 included in database 230 using Smart Trigger based data set processing 270.

Figure 3A:
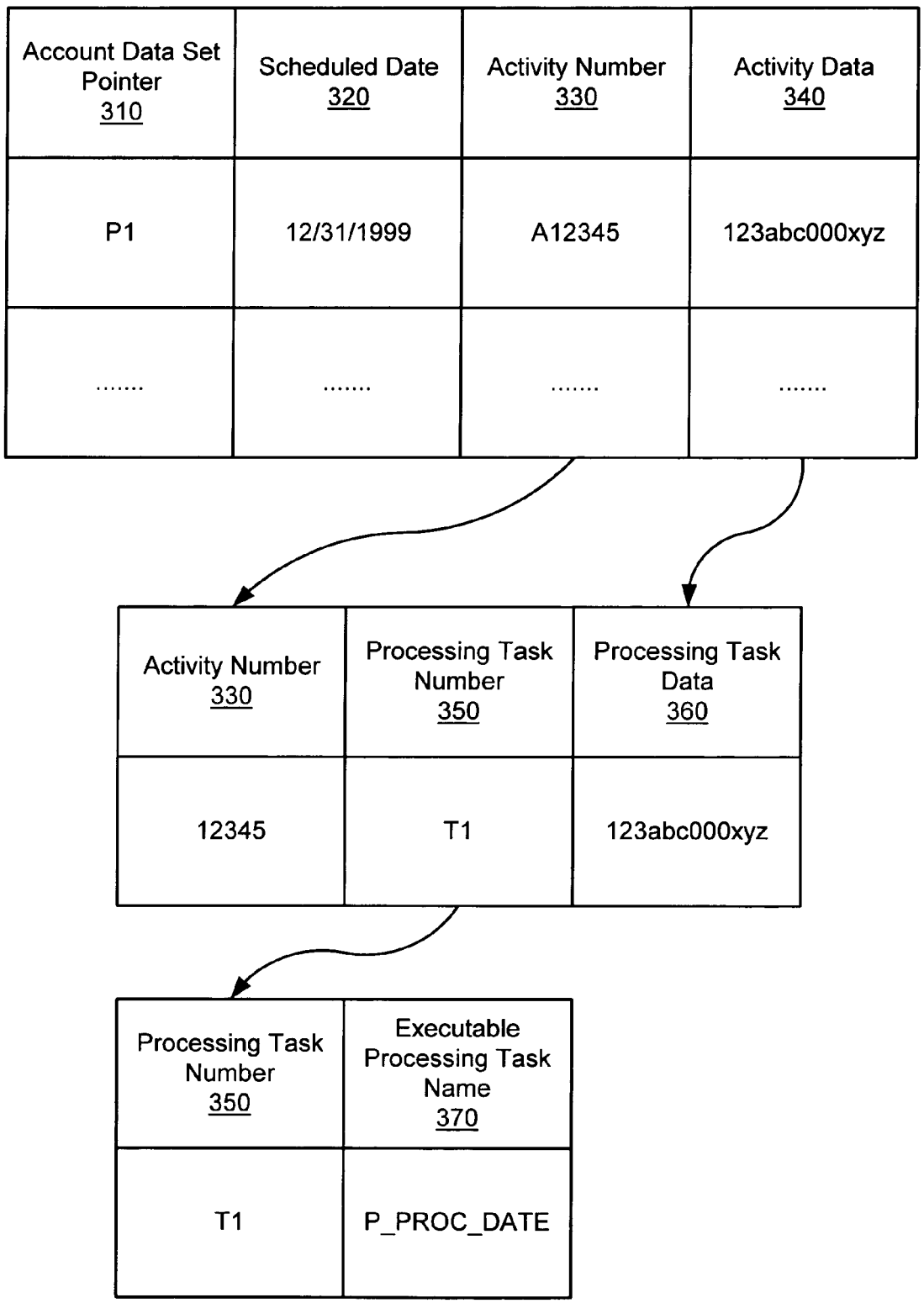
FIG. 3a is a data flow diagram illustrating a Smart Trigger selection for an associated executable processing task according to one embodiment.

FIG. 3a is a data flow diagram illustrating a Smart Trigger selection for an associated executable processing task according to one embodiment. The Smart Trigger table according to one embodiment comprises a list of pointers to an account data set 310 which need further processing as identified by a specific activity number 330 using activity data 340 on a user specified scheduled date 320. The specific activity number 330 is used as a key to access the associated processing task number 350 which in turn is used as a key to access an executable processing task name 370.

FIG. 3b is a diagram illustrating a Smart Trigger date dependent data set selection according to one embodiment. The scheduled date being equal to or greater than today's date is a trigger to process the specific account data set 310 linked to the specific processing task name 370 as explained in FIG. 3a.

Figure 4A:
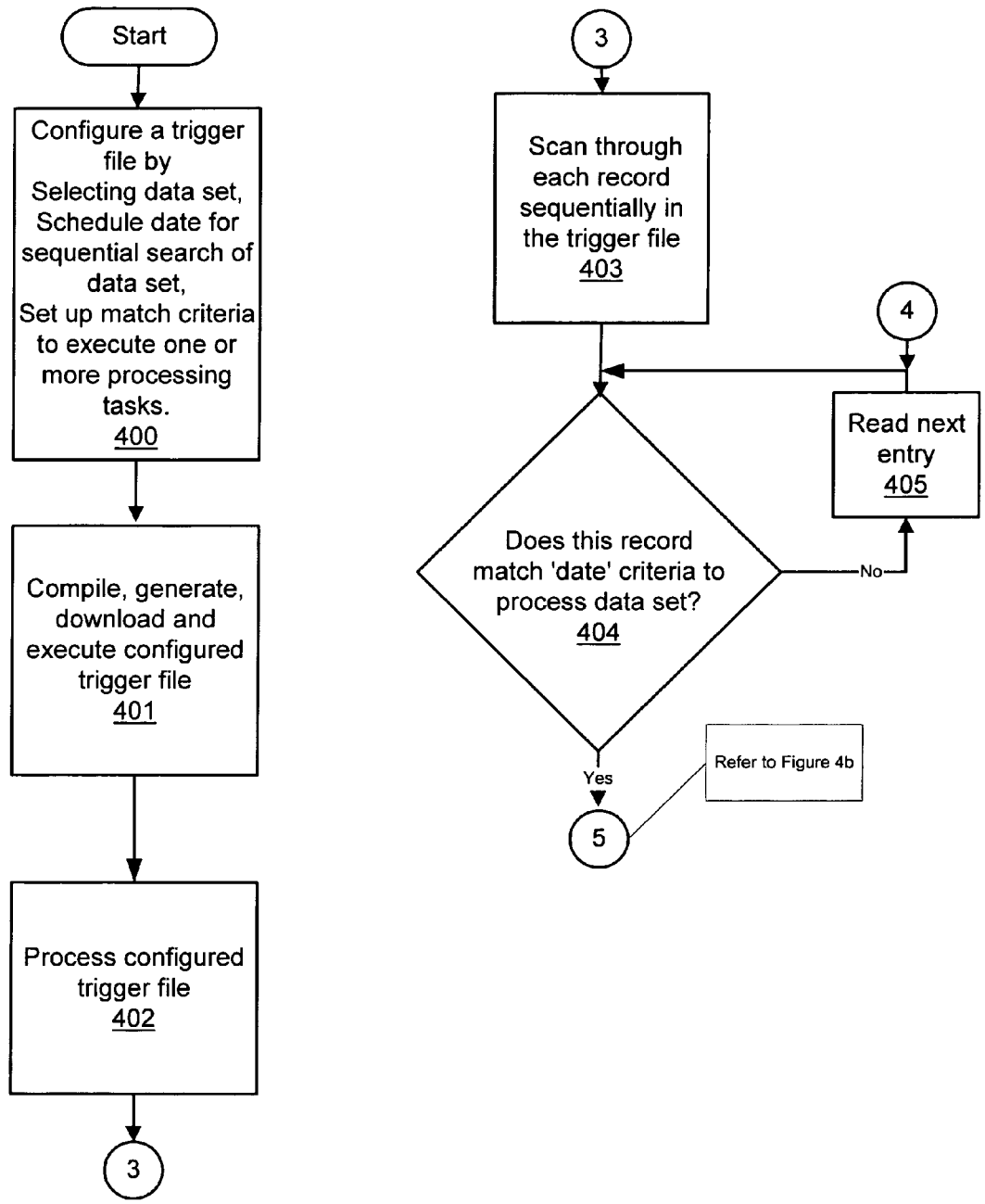
FIG. 4a is a flowchart illustrating the configuration and runtime use of prior art data set processing method for an FSO computer system, according to one embodiment.

FIG. 4a is a flowchart illustrating the configuration and runtime use of prior art data set processing method for an FSO computer system, according to one embodiment. In one embodiment, steps 400 and 405 may be performed in a business transaction processing program in the FSO system. The user of the FSO computer may START the data set processing method by initiating a business transaction. In step 400, a user of the FSO computer system may set up a TRIGGER file to process FSO related data sets on a specific scheduled date. The user would further define a series of evaluation criteria for every record in the FSO data set to determine if FSO computer needs to execute one or more processing tasks. For example, one embodiment of a FSO related data set may be an FSO account master file. An embodiment of a processing task may determine if the credit card expiration date falls within the next two months and if it does the processing task may further include extending the expiration date of the FSO issued credit card by one year. In step 401, the FSO data set processing software may be compiled, generated and downloaded. In step 402, the user may initiate the task to process the TRIGGER FILE. In step 403, the trigger file is processed sequentially. The first record in the file which may consist of a data set pointer and a scheduled date may be read. In step 404, a comparison may be made between the scheduled date and the current date to determine if the current record of the FSO data set needs further processing. As one embodiment, if the current date is greater than or equal to the scheduled date then the current record may need further processing. In step 405, if the current date is less than the scheduled date then the next sequential record in the FSO data set may be read and the step 404 may be executed again.

Figure 4B:
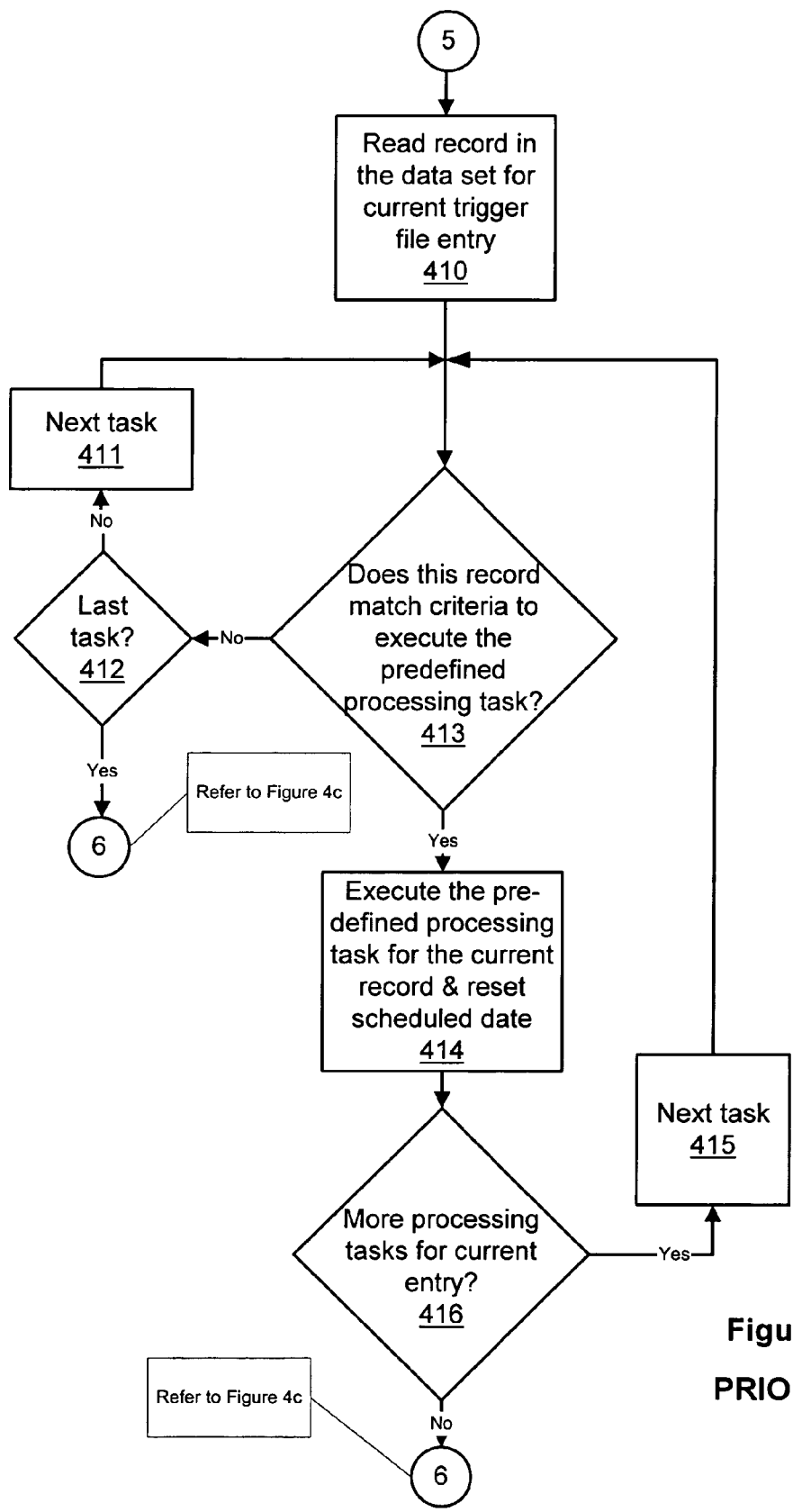

FIG. 4b is a continuation of flowchart in FIG. 4a. Step 410 is executed after step 404 in FIG. 4a. In step 410, the data set pointer may be used to access the entire record in the FSO data set. In step 413, the data contained in the FSO record may be evaluated to determine if criteria for executing one or more processing tasks have been met. If the one or more evaluation criteria are matched then step 414 would be executed next. If the one or more evaluation criteria are not matched then step 412 would be executed next. As one embodiment of the criteria for executing a processing task to extend the credit card expiration date, an evaluation may be made to determine if the current credit card expiration date falls within the next two months. In step 414, if the data in the FSO record met the criteria then the processing task may be executed. As one embodiment, the processing task may extend the expiration date of the FSO issued credit card by one year for the current FSO record. In step 416, an evaluation may be made if there are any additional processing tasks for the current FSO record. If it is determined that there may be additional processing tasks then step 415 would be executed next. If it is determined that there may be no additional processing tasks then step 420 would be executed next. In step 412, since it has been determined that one or more evaluation criteria were not matched, a further evaluation may be made to determine if additional processing tasks remain to be processed for the current FSO record. If no additional processing tasks remain to be processed for the current FSO record then the program control would go to step 420 in FIG. 4c. If additional processing tasks remain to be processed for the current FSO record then step 411 would be executed next. In step 411, the next processing task for the current sequential record in the FSO data set may be accessed and program control may be transferred to step 413 in FIG. 4b. In step 415, the next processing task for the current sequential record in the FSO data set may be accessed and program control may be transferred to step 413 in FIG. 4b.

Figure 4C:
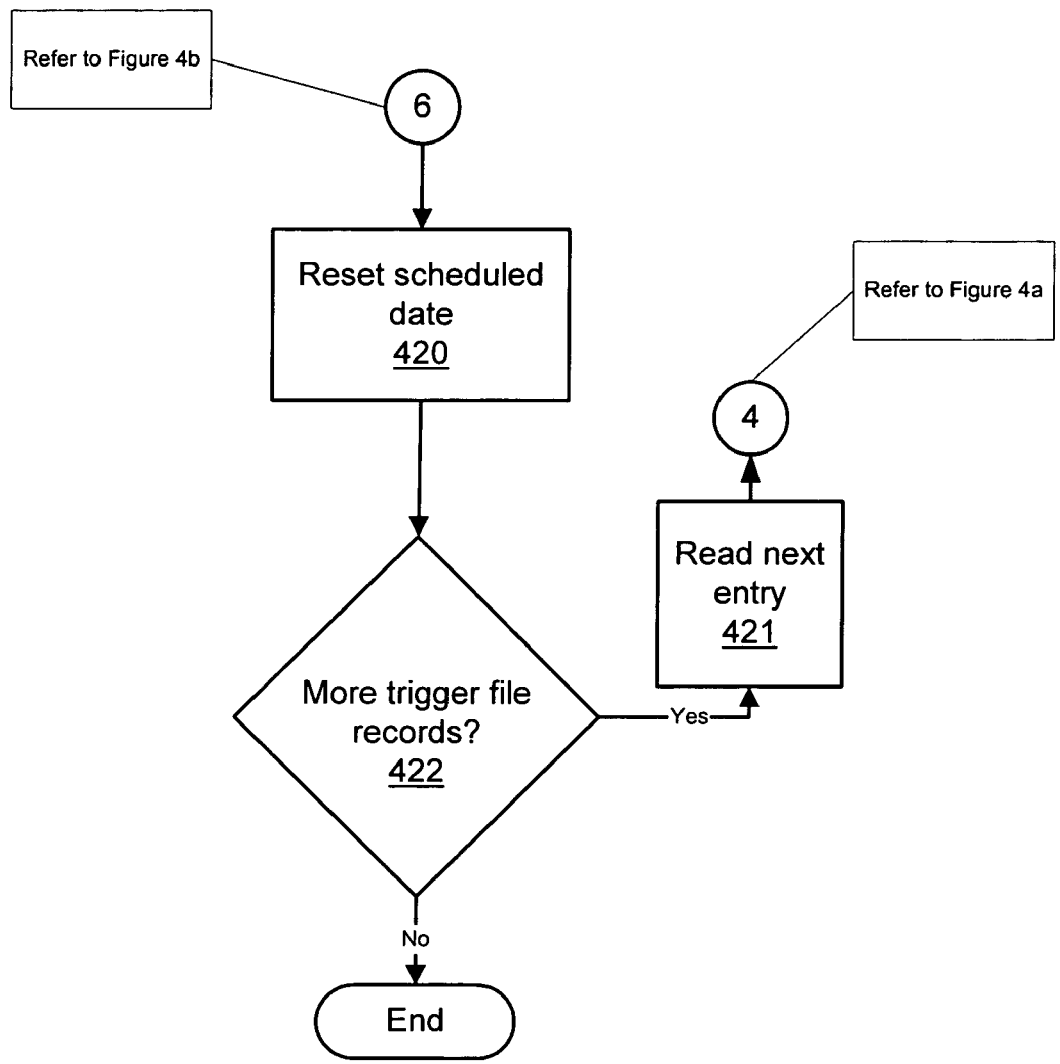
FIG. 4c is a continuation of the flowchart in FIG. 4b.

FIG. 4c is a continuation of flowchart in FIG. 4b. In step 420, the scheduled date may be reset to indicate that all processing tasks for the current FSO record may have been completed. Program control may then be transferred to step 422. In step 422, an evaluation may be made if there are any additional records of the current FSO data set. If there are additional records to be processed then program control may be transferred to step 421. If there are no additional records to be processed then program control may be transferred to the END step. In step 421, the next sequential record for the current FSO data set may be accessed and program control may be transferred to step 404 in FIG. 4a.

Figure 5:
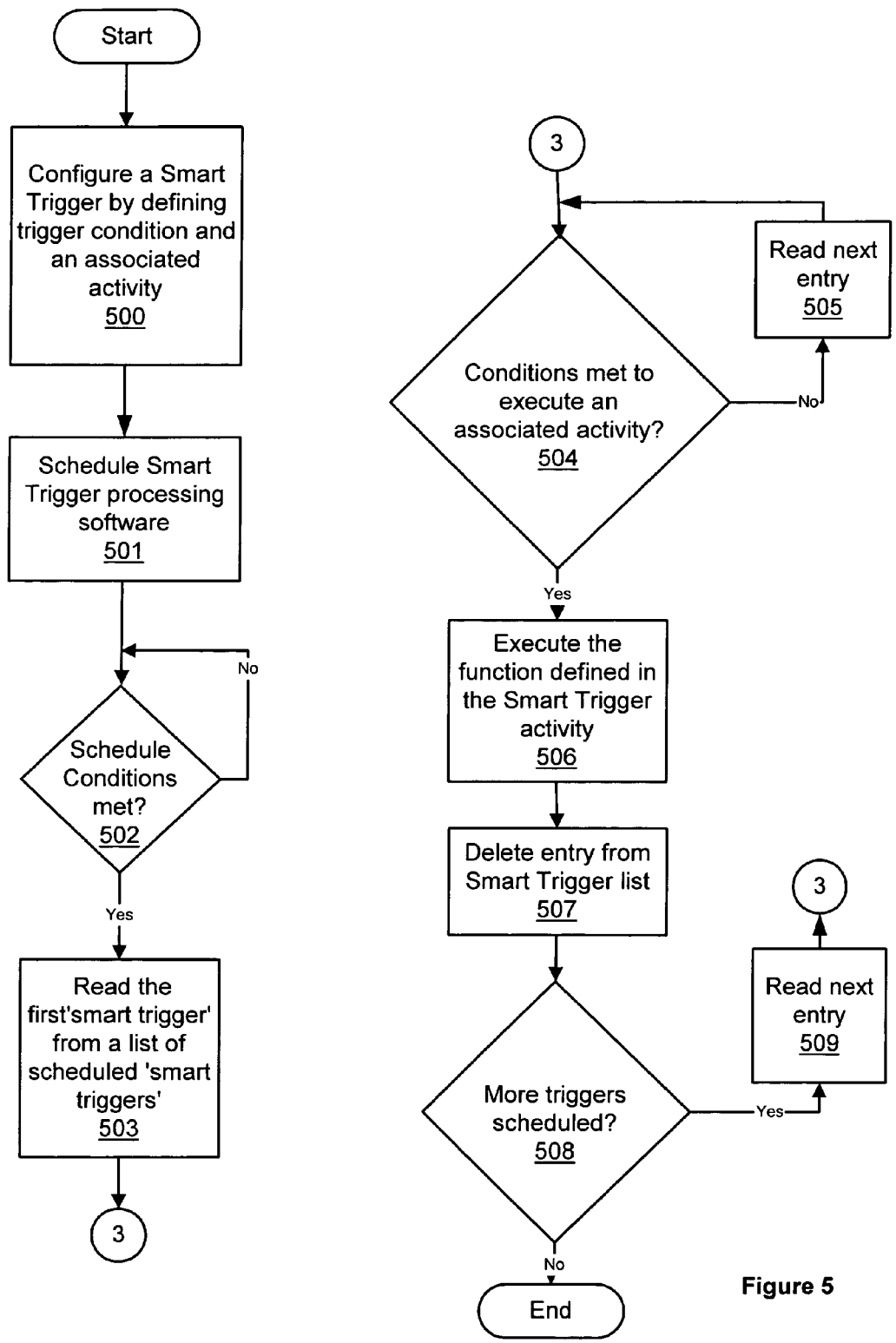
FIG. 5 is a flowchart illustrating the configuration and runtime use of a Smart Trigger based processing method for an FSO computer system, according to one embodiment.

FIG. 5 is a flowchart illustrating the configuration and runtime use of a Smart Trigger based processing method for an FSO computer system, according to one embodiment. In one embodiment, steps 500 and 509 may be performed in a business transaction processing program in the FSO system. A user of the FSO computer may START the data set processing method by initiating a business transaction. In step 500, the user of the FSO computer system may configure a Smart Trigger by defining an identifier for an FSO data set, a scheduled date and an identifier for an associated processing task. In another embodiment, the user may also define a data field with the associated processing task identifier. As one embodiment, the user may set up a Smart Trigger table for processing one or more accounts of an FSO data set on a particular scheduled date by assigning an associated task to be executed when certain pre-defined condition such as current date is equal to or greater than the scheduled date has been met. In step 501, the user of the FSO computer system may schedule a task to be executed at a user defined period to process the Smart Trigger table. In step 502, an evaluation may be made if certain predefined condition such as execution date and time for processing Smart Trigger task is equal to or greater than the current date and time has been met. If the scheduled conditions are met then the Smart Trigger table may be ready for processing in step 503. If the scheduled conditions have not been met then step 502 will loop on itself. In step 503, the processing of the Smart Trigger table may be initiated by reading the first row of the Smart Trigger table. In step 504, an evaluation may be made if certain predefined condition such as scheduled date field obtained by reading the data from the first row in the Smart Trigger table is equal to or less than the current date has been met. If the predefined date condition has been met then program control is passed on to step 506. If the predefined date condition has not been met then program control is passed on to step 505. In step 505, the current row index for the Smart Trigger is incremented by one. After reading the data for the new row, program control is passed on to step 504. In step 506, if the data contained in a row of the Smart Trigger table met the predefined date conditions then the associated processing task may be executed. As one embodiment, the processing task may extend the expiration date of the FSO issued credit card by one year for the current FSO record. In step 507, the scheduled date field in the Smart Trigger table may be reset to indicate that the processing task for the current row of the Smart Trigger table may have been completed. In step 508, an evaluation may be made if there are any additional rows of the Smart Trigger table. If there are additional rows to be processed then program control may be transferred to step 509. If there are no additional rows to be processed then program control may be transferred to the END step. In step 509, the next row for the Smart Trigger table may be accessed and program control may be transferred to step 504 in FIG. 5.

Figure 6:
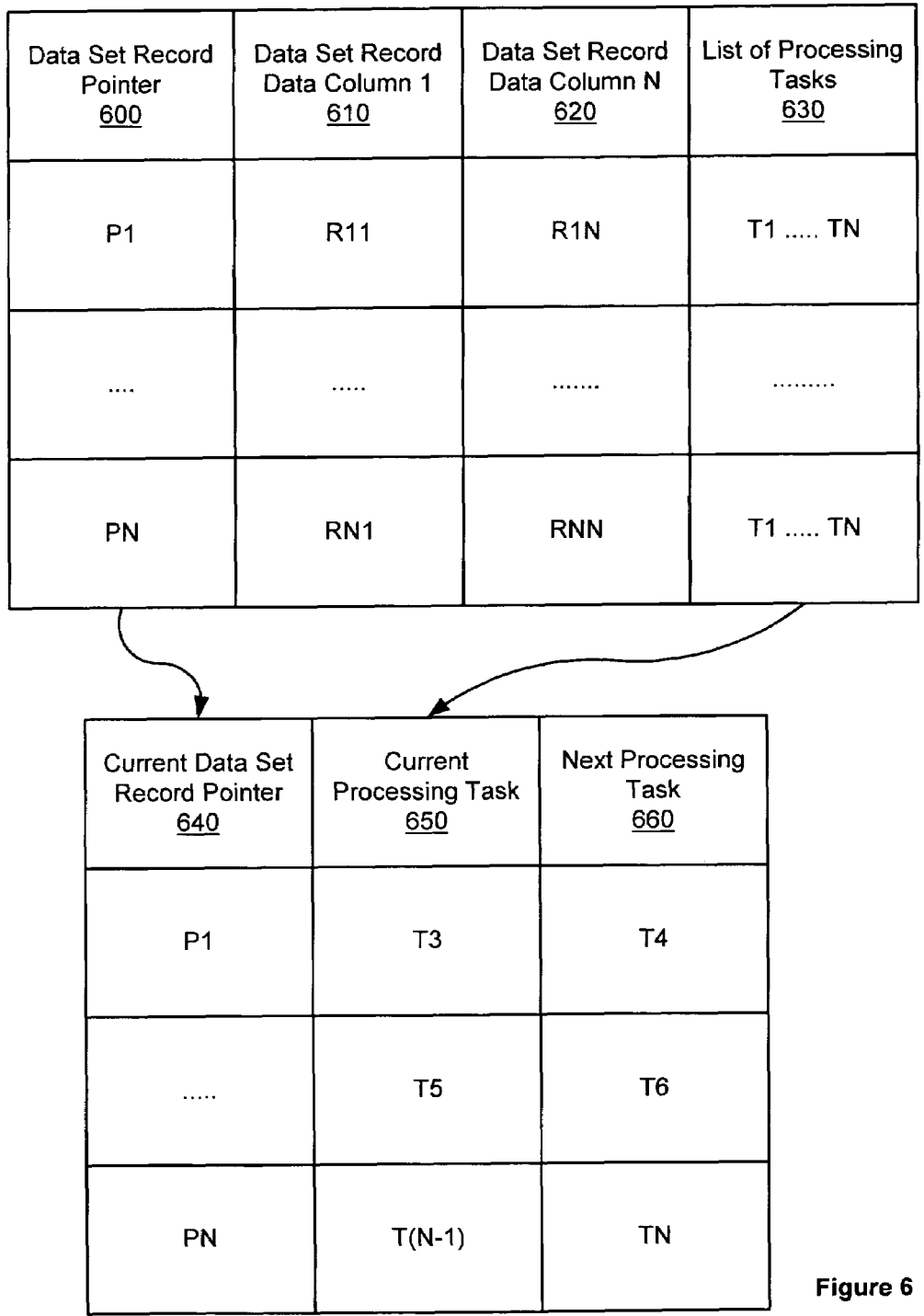
FIG. 6 is a data flow diagram illustrating sequential processing of a FSO data set in prior art, according to one embodiment.

FIG. 6 is a data flow diagram illustrating sequential processing of a FSO data set in prior art, according to one embodiment. A data set may consist of one or more data records. A data set record pointer 600, which may vary from P1 through PN, may be used as a pointer to the physical storage location of the data set record. The data in the data set record may be stored in data column #1 610 through data column #N 620. For each data set record, one or more evaluations may have to be made for every processing task T1 through TN 630. The data set processing may be initiated by reading data set pointer P1. Data set record 610 and 620 associated with P1 may be evaluated to determine if processing task T1, T2, T3 and others through TN need to be executed. In one embodiment, 650 may store the current processing task and 660 may store the next processing task. Once all processing tasks T1 through TN associated with the first data set pointer P1 have been completed then the same process can be repeated for data set pointer P2. The data set sequential processing may continue by reading data set pointer P3 through PN and evaluating and executing processing tasks T1 through TN for each data set pointer.

FIG. 7 is a data flow diagram illustrating selective task processing of a FSO data set using Smart Trigger, according to one embodiment. A data set may consist of one or more data records. A data set record pointer 700, which may vary from P1 through PN, may be used as a pointer to the physical storage location of the data set record (not shown). A selective task processing method using Smart Trigger may build a list of associated data set pointers for a specific processing task T1 710. In one embodiment, data set records with data set record P2, P5 and PN have been specifically identified to execute processing task T1. Similar lists may be built for processing tasks T2 through TN. Data contained in the data records may be accessed by tasks T1 through TN using associated data set pointers 700.

Figure 8:
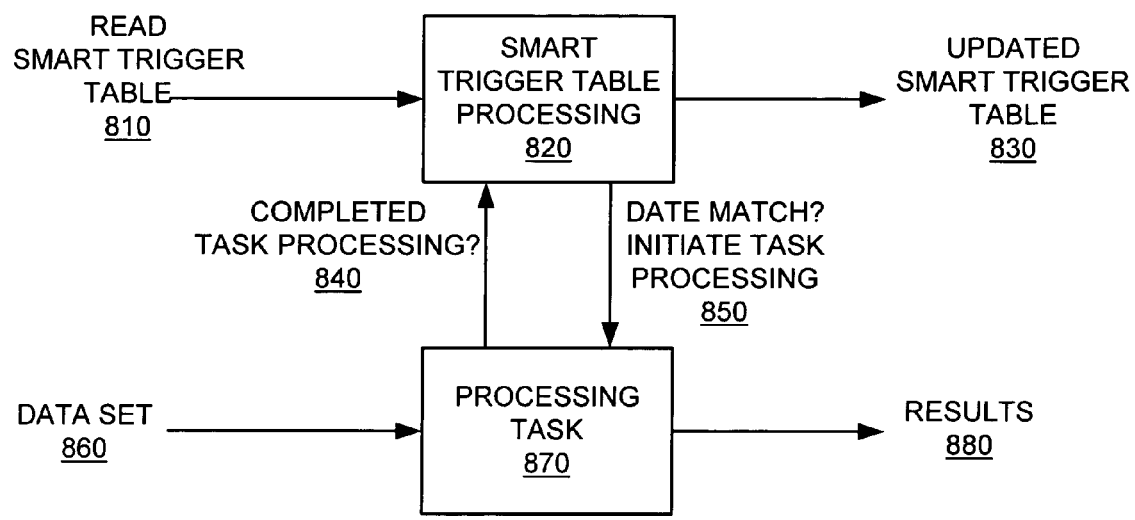
FIG. 8 is a block diagram illustrating a scheduled task processing entries in a Smart Trigger table, according to one embodiment.

FIG. 8 is a block diagram illustrating a scheduled task processing entries in a Smart Trigger table, according to one embodiment. The user of the FSO computer system may schedule a task to be executed at a user-defined period to process the Smart Trigger table. An evaluation may be made if certain predefined condition such as execution date and time for processing Smart Trigger task is equal to or greater than the current date and time has been met. If the scheduled conditions are met then the Smart Trigger table may be ready for processing by reading the smart trigger table 810. If the scheduled date included in the smart trigger table record meets the trigger conditions 850 then the associated task may be processed 870. The associated processing task 870 may use specified data set 860 to generate results 880. On completion of the processing of the associated task 840, the scheduled date may be updated in the smart trigger table 830 to indicate its completion.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of selectively processing tasks in a Financial Service Organization (FSO) computer system, wherein the FSO computer system comprises a plurality of FSO related data sets and a plurality of computer executable FSO related processing tasks, the method comprising:

providing a first set of data set identifiers, each of the data identifiers corresponding to a physical storage location of one or more data set records;

building a list of associated data set identifiers corresponding to the physical storage location of the one or more data set records for each of the plurality of FSO related processing tasks, wherein each of the lists is a subset of the first set of data identifiers;

creating a plurality of smart triggers, each of the smart triggers comprising:
 a task identifier that identifies one of the FSO related processing tasks; and
 at least one data set identifier selected from the list of data set identifiers associated with the FSO related processing task identified by the task identifier;
 scheduling a date for processing each of the smart triggers;

configuring a smart trigger table having the plurality of the created smart triggers, the smart trigger table comprising, for each of the created smart triggers:
 the task identifier associated with the smart trigger;
 the at least one data identifier associated with the smart trigger; and
 the scheduled date for processing the smart trigger;

storing the configured smart trigger table in a first memory of the computer system;

reading sequentially at least two of the smart triggers from the first memory; and, for each, of the smart triggers read from the first memory:
 comparing the scheduled date for processing the smart trigger to the current date; and
 executing the FSO related processing task associated with the smart trigger to process the data contained in the data set records associated with one or more of the data set identifiers associated with the smart trigger in response to reading the smart trigger from the first memory if the scheduled date of the smart trigger is equal to or before the current date, but not executing the FSO related processing task in response to reading the smart trigger from the first memory if the scheduled date of the smart trigger is after the current date,
 wherein executing each of at least two of the executed FSO related processing tasks comprises:
 using the task identifier associated with the smart trigger to identify the FSO related processing task to be executed in response to reading the smart trigger; and using the at least one data identifier associated with the smart trigger to identify FSO related data set records to be processed in response to reading the smart trigger;

wherein executing each of at least two of the FSO related processing tasks comprises executing the FSO related processing task on FSO related data set records that correspond to the at least one data set identifier from the list of associated data set identifiers for the FSO related processing task, but not executing the FSO related processing task on FSO related data set records that do not correspond to the data set identifiers from the list of associated data set identifiers for the FSO related processing task.

2. The method of claim 1, wherein storing the smart trigger table in the first memory is performed by an application program executing in the FSO computer system.

3. The method of claim 1, wherein storing the smart trigger table in the first memory is performed by a user of the FSO computer system.

4. The method of claim 1, further comprising processing at least one of the smart triggers to generate a first processed smart trigger.

5. The method of claim 4, wherein processing at least one of the smart triggers comprises deleting the task identifier from the smart trigger.

6. The method of claim 5, wherein the smart trigger table comprises N rows each one of which comprises one smart trigger, the method further comprising:
 a) setting a counter X to one;
 b) incrementing X by one;
 c) reading an Xth smart trigger from the smart trigger table;
 d) comparing an Xth scheduled date of the Xth smart trigger to the current date;
 e) executing an Xth processing task and processing Xth data contained in an Xth data set in response to the Xth scheduled date of the Xth smart trigger being on or before the current date;
 f) not executing the Xth processing task in response to the Xth scheduled date of the Xth smart trigger being after the current date; and
 g) repeating b) through f) until X equals N.

7. The method of claim 5, wherein the method further comprises deleting at least one of the processing task identifiers in response to executing the processing task.

8. The method of claim 1, wherein at least one of the smart triggers comprises one or more data fields, wherein data in the one or more data fields is passed to the FSO related processing task of the smart trigger in response to reading the smart trigger.

9. The method of claim 1, wherein at least one of the FSO related data sets comprises a customer account record containing data relating to a customer of the FSO, wherein the data identifier assigned to the FSO related data set comprises a customer account number corresponding to the customer account record.

10. The method of claim 1, wherein the FSO computer system further comprises a smart trigger processing task for processing the smart trigger table, wherein the smart trigger processing task is configurable to be executed periodically, wherein the scheduling of the period of execution is configurable by a user of the FSO computer system.

11. The method of claim 1, wherein the smart trigger table comprises a list of pointers to an account data set, wherein the smart trigger table includes:

an activity number associated with each of the pointers, wherein the activity numbers identify further processing of the account data set; and activity data associated with each of the activities numbers, wherein the activity data is processed on a user specified scheduled date.

12. The method of claim 11, wherein the activity number is used as a key to access an associated processing task number.

13. The method of claim 12, wherein the associated processing task number is used to access an executable processing task name.

14. A computer readable medium comprising program instructions, wherein the program instructions are executable by a computer system to implement:

providing a first set of data identifiers, each of the data identifiers corresponding to a physical storage location of one or more data set records;

building a list of associated data set identifiers corresponding to the physical storage location of the one or more data set records for each of a plurality of Financial Service Organization (FSO) related processing tasks, wherein each of the lists is a subset of the first set of data identifiers;

creating a plurality of smart triggers, each of the smart triggers comprising:
 a task identifier that identifies one of the FSO related processing tasks; and
 at least one data set identifier selected from the list of data set identifiers associated with the FSO related processing task identified by the task identifier;

scheduling a date for processing each of the smart triggers;

configuring a smart trigger table having the plurality of the created smart triggers, the smart trigger table comprising, for each of the created smart triggers:
 the task identifier associated with the smart trigger;
 the at least one data identifier associated with the smart trigger; and
 the scheduled date for processing the smart trigger;

storing the configured smart trigger table in a first memory of the computer system;

reading sequentially at least two of the smart triggers from the first memory; and executing the FSO related processing task associated with the smart trigger to process the data contained in the data set records associated with one or more of the data set identifiers associated with the smart trigger in response to reading the smart trigger from the first memory if the scheduled date of the smart trigger is equal to or before the current date, but not executing the FSO related processing task in response to reading the smart trigger from the first memory if the scheduled date of the smart trigger is after the current date, wherein executing each of at least two of the executed FSO related processing tasks comprises:

using the task identifier associated with the smart trigger to identify the FSO related processing task to be executed in response to reading the smart trigger; and using the at least one data identifier associated with the smart trigger to identify FSO related data set records to be processed in response to reading the smart trigger;

wherein executing each of at least two of the FSO related processing task comprises executing the FSO related processing task on FSO related data set records that correspond to the at least one data set identifier from the list of associated data set identifiers for the FSO related processing task, but not executing the FSO related processing task on FSO related data set records that do not correspond to the data set identifiers from the list of associated data set identifiers for the FSO related processing task.

15. The computer readable medium of claim 14, wherein storing the smart trigger table in the first memory is performed by an application program executing in the FSO computer system.

16. The computer readable medium of claim 14, wherein storing the smart trigger table in the first memory is performed by a user of the FSO computer system.

17. The computer readable medium of claim 14, wherein the program instructions are further executable by the computer system to implement: processing at least one of the smart triggers to generate a first processed smart trigger.

18. The computer readable medium of claim 17, wherein the processing at least one of the smart triggers comprises deleting the task identifier from the smart trigger.

19. The computer readable medium of claim 18, wherein the smart trigger table comprises N rows each one of which comprises one smart trigger, and wherein the program instructions are further executable by the computer system to implement:
   a) setting a counter X to one;
   b) incrementing X by one;
   c) reading an Xth smart trigger from the smart trigger table;
   d) comparing an Xth scheduled date of the Xth smart trigger to the current date;
   e) executing an Xth processing task and processing Xth data contained in an Xth data set in response to the Xth scheduled date of the Xth smart trigger being on or before the current date;
   f) not executing the Xth processing task in response to the Xth scheduled date of the Xth smart trigger being after the current date; and
   g) repeating b) through f) until X equals N.

20. The computer readable medium of claim 17, wherein the program instructions are farther executable by the computer system to implement: deleting at least one of the processing task identifiers in response to executing the processing task.

21. The computer readable medium of claim 14, wherein at least one of the smart triggers comprises one or more data fields, wherein data in the one or more data fields is passed to the FSO related processing task of the smart trigger in response to reading the smart trigger.

22. The computer readable medium of claim 14, wherein at least one of the FSO related data sets comprises a customer account record containing data relating to a customer of the FSO, wherein the data identifier assigned to the FSO related data set comprises a customer account number corresponding to the customer account record.

23. The computer readable medium of claim 14, wherein the FSO computer system further comprises a smart trigger processing task for processing the smart trigger table, wherein the smart trigger processing task is configurable to be executed periodically, wherein the scheduling of the period of execution is configurable by a user of the FSO computer system.

24. A system comprising:
   a computer program;
   a Financial Service Organization (FSO) computer system comprising a plurality of FSO related data sets, and comprising a plurality of computer executable FSO related processing tasks;
   wherein the computer program is executable on the computer system to execute:
      providing a first set of data identifiers, each of the data identifiers corresponding to a physical storage location of one or more data set records;
      building a list of associated data set identifiers corresponding to the physical storage location of the one or more data set records for each of the plurality of the FSO related processing tasks, wherein each of the lists is a subset of the first set of data identifiers;
      creating a plurality of smart triggers, each of the smart triggers comprising:
         a task identifier that identifies one of the FSO related processing tasks; and
         at least one data set identifier selected from the list of data set identifiers associated with the FSO related processing task identified by the task identifier;
      scheduling a date for processing each of the smart triggers;
      configuring a smart trigger table having the plurality of the created smart triggers, the smart trigger table comprising, for each of the created smart triggers:
         the task identifier associated with the smart trigger;
         the at least one data identifier associated with the smart trigger; and
         the scheduled date for processing the smart trigger;
      storing the configured smart trigger table in a first memory of the computer system;
      reading sequentially at least two of the smart triggers from the first memory; and
      executing the FSO related processing task associated with the smart trigger to process the data contained in the data set records associated with one or more of the data set identifiers associated with the smart trigger in response to reading the smart trigger from the first memory if the scheduled date of the smart trigger is equal to or before the current date, but not executing the FSO related processing task in response to reading the smart trigger from the first memory if the scheduled date of the smart trigger is after the current date,
   wherein executing each of at least two of the executed FSO related processing tasks comprises:
      using the task identifier associated with the smart trigger to identify the FSO related processing task to be executed in response to reading the smart trigger; and
      using the at least one data identifier associated with the smart trigger to identify FSO related data set records to be processed in response to reading the smart trigger;
   wherein executing each of at least two of the FSO related processing task comprises executing the FSO related processing task on FSO related data set records that correspond to the at least one data set identifier from the list of associated data set identifiers for the FSO related processing task, but not executing the FSO related processing task on FSO related data set records that do not correspond to the data set identifiers from the list of associated data set identifiers for the FSO related processing task.

25. The system of claim 24, wherein storing the smart trigger table in the first memory is performed by an application program executing in the FSO computer system.

26. The system of claim 24, wherein storing the smart trigger table in the first memory is performed by a user of the FSO computer system.

27. The system of claim 24, wherein the computer program is further executable on the FSO computer system to execute: processing at least one of the smart triggers to generate a first processed smart trigger.

28. The system of claim 27, wherein processing at least one of the smart triggers comprises deleting the task identifier from the smart trigger.

29. The system of claim 28, wherein the smart trigger table comprises N rows each one of which comprises one smart trigger, and wherein the computer program is further executable on the FSO computer system to execute:
   a) setting a counter X to one;
   b) incrementing X by one;
   c) reading an Xth smart trigger from the smart trigger table;
   d) comparing an Xth scheduled date of the Xth smart trigger to the current date;
   e) executing an Xth processing task and processing Xth data contained in an Xth data set in response to the Xth scheduled date of the Xth smart trigger being on or before the current date;
   f) not executing the Xth processing task in response to the Xth scheduled date of the Xth smart trigger being after the current date; and
   g) repeating b) through f) until X equals N.

30. The method of claim 28, wherein the computer program is further executable on the computer system to execute: deleting at least one of the processing task identifiers in response to executing the processing task.

31. The system of claim 24, wherein at least one of the smart trigger comprises one or more data fields, wherein data in the one or more data fields is passed to the FSO related processing task of the smart trigger in response to reading the smart trigger.

32. The system of claim 24, wherein at least one of the FSO related data sets comprises a customer account record containing data relating to a customer of the FSO, wherein the data identifier assigned to the FSO related data set comprises a customer account number corresponding to the customer account record.

33. The system of claim 24, wherein the FSO computer system further comprises a smart trigger processing task for processing the smart trigger table, wherein the smart trigger processing task is configurable to be executed periodically, wherein the scheduling of the period of execution is configurable by a user of the FSO computer system.

* * * * *

UNITED STATES PATENT AND TRADEMARK OFFICE
CERTIFICATE OF CORRECTION

PATENT NO. : 7,571,171 B1 Page 1 of 1
APPLICATION NO. : 09/699038
DATED : August 4, 2009
INVENTOR(S) : Shaw It is certified that error appears in the above-identified patent and that said Letters Patent is hereby corrected as shown below:

Claim 20, col. 15, line 40, please delete "farther" and substitute therefor -- further --.

Signed and Sealed this

Sixth Day of October, 2009

David J. Kappos
*Director of the United States Patent and Trademark Office*